(12) United States Patent
Floman et al.

(10) Patent No.: US 6,684,324 B2
(45) Date of Patent: *Jan. 27, 2004

(54) METHOD FOR INSTALLING TWO OR MORE OPERATING SYSTEMS/USER INTERFACES INTO AN ELECTRONIC DEVICE AND AN ELECTRONIC DEVICE

(75) Inventors: Matti Floman, Tampere (FI); Markku Lipponen, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,605

(22) Filed: Oct. 8, 1999

(65) Prior Publication Data
US 2003/0084206 A1 May 1, 2003

(30) Foreign Application Priority Data
Oct. 9, 1998 (FI) .................................................. 982194

(51) Int. Cl.[7] ............................. G06F 9/24; G06F 13/00
(52) U.S. Cl. ............................. 713/1; 713/25; 710/100
(58) Field of Search ........................ 713/1, 2; 370/915; 710/100; 709/223, 229; 707/10

(56) References Cited

U.S. PATENT DOCUMENTS

| | | | |
|---|---|---|---|
| 5,418,837 A | 5/1995 | Johansson et al. ............. | 379/58 |
| 5,689,825 A | 11/1997 | Averbuch et al. .............. | 455/89 |
| 5,870,610 A * | 2/1999 | Beyda ............................ | 713/1 |
| 5,928,347 A * | 7/1999 | Jones ............................. | 710/100 |
| 6,295,645 B1 * | 9/2001 | Brewer ......................... | 717/173 |
| 6,356,543 B2 * | 3/2002 | Hall et al. .................... | 370/328 |

FOREIGN PATENT DOCUMENTS

| | | | |
|---|---|---|---|
| DE | 19531121 A1 | 2/1997 | |
| DE | 195 43 843 | 5/1997 | |
| EP | 459344 A1 * | 12/1991 | ............ H04Q/7/04 |
| GB | 2269032 | 1/1994 | |
| WO | WO 97/16938 | 5/1997 | |
| WO | WO 98/38820 | 9/1998 | |

OTHER PUBLICATIONS

Loucks et al, A Microkernel–Based Operating System for Personal Digital Assistants, 1993 IEEE.*

* cited by examiner

Primary Examiner—Thomas Lee
Assistant Examiner—Suresh K Suryawanshi

(57) ABSTRACT

The invention relates to a method for downloading control software/operating systems of user interfaces into an electronic device (1), which comprises two or more processor blocks (2a, 2b), where in at least two processor blocks (2a, 2b) a user interface (UI1, UI2) is used. Furthermore, one or more operating systems are executed in the electronic device (1). The downloading is executed via one said processor block (2a, 2b), wherein the control software/operating systems are downloaded into said one processor block (2a, 2b), from which the control software/operating systems related to other user interfaces are loaded into said other processor blocks (2a, 2b). The invention also relates to an electronic device (1) which comprises at least one processor (3a, 3b), at least two processor blocks (2a, 2b), at least one user interface (UI1, UI2), memory means (4a) for storing the control software of the user interface (UI1, UI2), means (8a, 8b, 10) for data transmission between a first (2a) and a second processor block (2b), and means (3a, 3b) for executing the functions of two or more operating systems. The invention also relates to a storing means for the downloading program of the control software/operating systems of the user interfaces in an electronic device (1).

18 Claims, 5 Drawing Sheets

METHOD FOR INSTALLING TWO OR MORE OPERATING SYSTEMS/USER INTERFACES INTO AN ELECTRONIC DEVICE AND AN ELECTRONIC DEVICE

BACKGROUND OF THE INVENTION

1. Field of the Invention

The present invention relates to a method according to the preamble of the appended claim 1 for downloading the control software of two or more operating systems/user interfaces into an electronic device. The invention also relates to an electronic device and storing means according to the method.

2. Brief Description of Related Developments

In this specification, the downloading of an operating system/user interface refers to the installation of the operating system and/or user interface into an electronic device in connection with its initialization, as well as to the updating of pre-installed control software of the operating system/user interface e.g. with a new version or with a different language version.

Electronic devices have been developed, in which features of two or more different devices, such as a mobile station and a data processing device, are combined. An example of such a device is the Nokia Communicator, in which a mobile station and a personal digital assistant are integrated in the same housing. However, these different functional units may have separate components, such as processors, memory means and a user interface which comprises for example a display, a keypad, a receiver and/or a microphone. Nevertheless, these functional blocks, which hereinbelow will be called a processor block, are provided with a data transmission connection between them, e.g. a serial bus, wherein these processor blocks can communicate with each other. To control the functions of such a device, a device-specific operating system is often developed. Typically, in such an integrated device, a separate operating system is implemented for each processor block. The basic function of the operating system is to take care of processor block system timings, resource management, user interface control, as well as message processing and transmission between the different program blocks of the same processor block and between different processor blocks.

In an electronic device, the operating system or part of it is stored e.g. in a fixed memory, such as a read only memory ROM. A problem with such a read only memory is, however, that in order to update the operating system into a newer version, a new read only memory circuit has to be installed, in which a new operating system version is stored. This change is difficult and requires opening of the housing of the device. Therefore, it has become common to use non-volatile random access memory circuits NVRAM, by means of which it is possible to update the operating system without opening the housing of the device. Such non-volatile memory circuits can be electrically erased, wherein the old system is deleted and written over with a new one before updating the operating system. However, also in this alternative, it is necessary that a new updating program is stored in the processor of the device to enable deleting of the old operating system and storing of the new one in the memory area allocated for the operating system. There are known non-volatile memory circuits whose memory space is organized into different blocks, wherein the memory can be erased for example one block at a time. Furthermore, one or more blocks can be protected in such a way that they cannot be erased, and thus the downloading software of the operating system is advantageously placed in such a protected memory block. However, the section that is to be updated is placed into the other blocks.

In devices of prior art, the installation and updating of an operating system is implemented in such a way that the device is arranged to be provided with a programming module or the like, through which the new operating system can be downloaded. This programming module comprises e.g. a serial mode interface via which the new operating system can be transferred to the programming module for example by means of a personal computer PC. One drawback in this arrangement is, for instance, that a separate module is required for each operating system necessary in the electronic device. Furthermore, the electronic device contains a separate interface for each processor block for the downloading of the operating system. Another possibility is to supply the operating system in a separate interface card, such as a memory card, that can be coupled to the electronic device. Thus, the new operating system can be implemented by replacing the old interface card with a new interface card. However, it is still necessary to provide each processor block with a separate interface, which complicates the structure of the device, requires more space, and increases the manufacturing costs of the device.

Furthermore, the downloading of the operating system via the serial bus of the computer is usually slow, because the speed of such a serial bus is not very high, typically 115 kilobits per second at the highest. The size of the operating system to be downloaded can be several megabytes, even tens of megabytes, wherein the downloading can take tens of minutes.

Even though the above discussion presented problems occurring in electronic devices of prior art when downloading entire operating systems, corresponding problems can also occur in situations when it is not necessary to download the operating systems as a whole, but only parts of these operating systems.

As was mentioned above, electronic devices of the above kind also comprise several user interfaces. To control these different user interfaces, control software for the user interface is installed in the electronic device. This control software can be partly integrated in the functions of the operating system, but e.g. for implementing different language versions, part of the control software of the user interface is implemented to be independent of the operating system. The control software of the user interfaces is also stored in the memory of the electronic device, advantageously at least partly in a (re-)writable memory. Problems similar to the aforementioned ones in installing and updating of operating systems are partly entailed in installing and updating of the control software for the user interfaces.

SUMMARY OF THE INVENTION

Although this specification primarily describes the downloading of operating systems, the principles of the present invention are also applicable to the downloading of control software in user interfaces and to the downloading of application software connected to the different parts of the electronic device.

The purpose of the present invention is to produce an improved method for installing/updating of two or more operating systems/user interfaces in an electronic device, and an electronic device in which two or more operating systems/user interfaces can be installed/updated via one interface. The method according to the present invention is characterized in what will be presented in the characterizing part of the appended claim 1. The electronic device according to the present invention is characterized in what will be presented in the characterizing part of the appended claim 7. Furthermore, the storing means according to the present invention is characterized in what will be presented in the characterizing part of the appended claim 11. The invention is based on the idea that the downloading of different operating systems, parts of the operating system and/or user interfaces in the electronic device is conducted via one processor block from which the sections to be downloaded are transmitted to each processor block via this single block.

With the present invention, considerable advantages are achieved when compared with methods and electronic devices of prior art. When using the method according to the invention, it is not necessary to establish a separate downloading interface of the operating system/user interface for each different processing block, but it is sufficient that the electronic device is provided with one downloading interface. Thus, it is possible to make the electronic device simpler in structure, and if necessary, smaller in size. When using wireless data transmission in the updating of the operating system/user interface, a further advantage is achieved, because it is not necessary to use separate adapters, and on the other hand, if necessary, it is possible to update the operating systems/user interfaces of several electronic devices simultaneously, which speeds up the initialization of new devices considerably. The device according to a preferred embodiment of the invention does not require a separate downloading interface, but upon downloading of the operating systems, it is possible to utilize another interface arrangement, such as infrared data transmission means, possibly available in connection with the electronic device. The present invention can be advantageously applied especially in portable electronic devices, which are preferably made light in weight and small in size. In a device according to yet another preferred embodiment of the invention, the downloading and updating of operating systems/user interfaces can be advantageously implemented via a mobile communication network, for example from the database of the manufacturer of the electronic device.

BRIEF DESCRIPTION OF THE DRAWINGS

In the following, the invention will be described in more detail with reference to the appended figures in which.

DETAILED DESCRIPTION OF THE PREFERRED EMBODIMENTS

Figure 1:
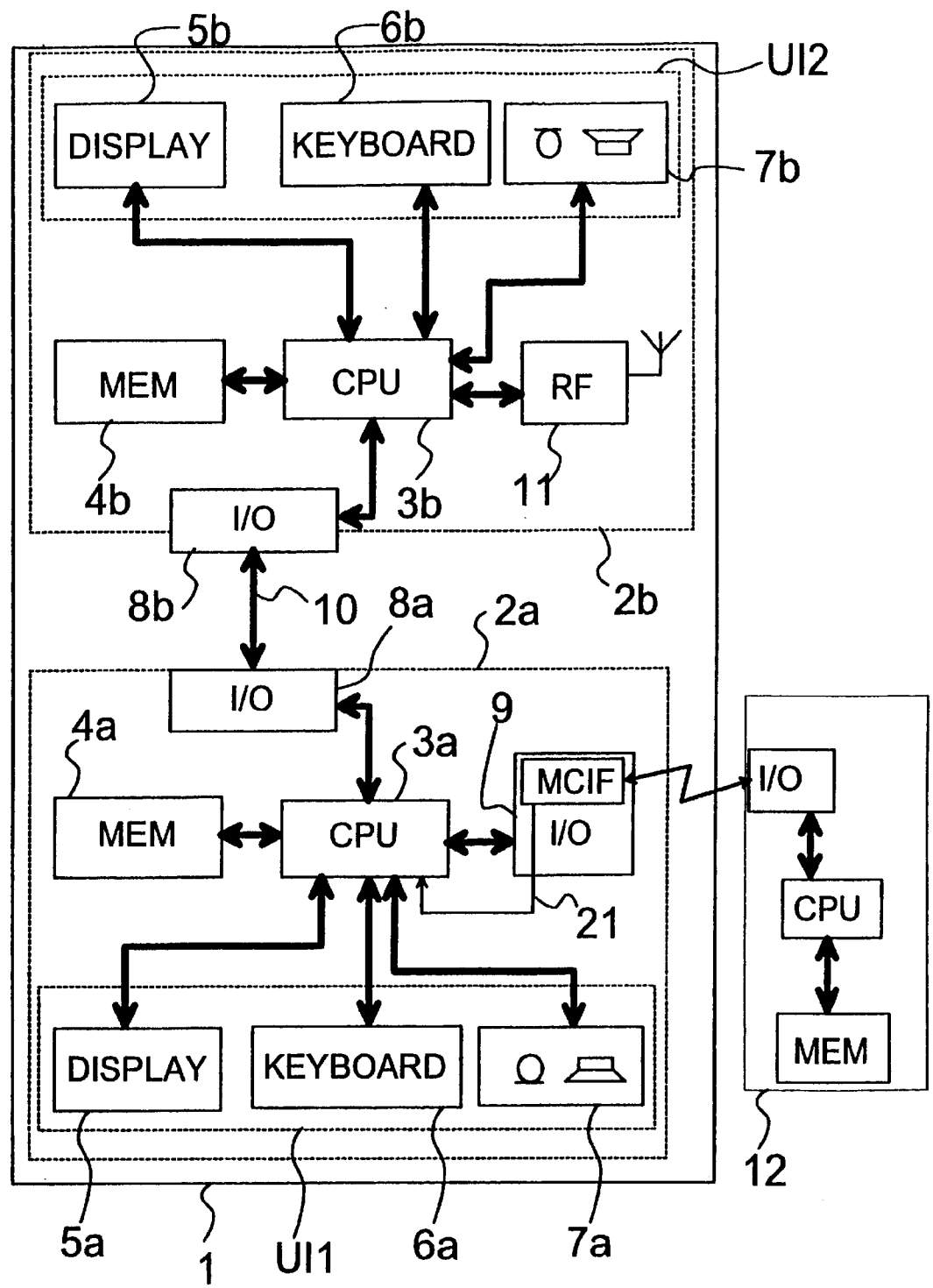
FIG. 1 shows an electronic device according to a first preferred embodiment of the invention in a reduced block diagram.

In the following, the invention will be described in more detail by using a communication device as an example of an electronic device 1, the communication device comprising two processor blocks 2a, 2b, of which, in this example, the first processor block 2a is a data processor, such as a personal digital assistant PDA, and the second processor block 2b in this example device is a wireless communication device CMT (Cellular Mobile Telephone) such as a mobile station according to the GSM system. It is obvious that the present invention is not restricted solely to such an electronic device 1, but it can also be applied in connection with other electronic devices in which two or more processors and one or more operating systems are used to control the functions of the electronic device 1. The processor blocks 2a, 2b can have separate user interfaces UI1, UI2, or the processor blocks can use a common user interface. Each processor is used to control the functions of different processor blocks 2a, 2b separately. Furthermore, the invention can also be applied in such electronic devices 1, in which each processor block 2a, 2b does not comprise a processor of its own, but a single processor is used to control the functions of different processor blocks 2a, 2b. Also in this case, the electronic device 1 can comprise one or more operating systems.

FIG. 1 shows such an electronic device 1 according to a preferred embodiment of the invention in a reduced block diagram. The first processor block 2a of the electronic device 1 comprises, for instance, a first processor 3a, first memory means 4a, a first user interface UI1, first bus interface means 8a, and external interface means 9.

Correspondingly, the second processor block 2b of the electronic device comprises for instance a second processor 3b, second memory means 4b, a second user interface UI2, and second bus interface means 8b. Furthermore, the second processor block 2b comprises a radio part 11, by means of which the electronic device 1 can communicate with a mobile communication network, such as a GSM, DCS or UMTS mobile communication network. In this electronic device 1 according to a preferred embodiment of the invention, communication between the processor blocks 2a, 2b is arranged to be conducted by means of an internal interface bus 10. In this example, the internal interface bus 10 is a serial mode interface bus, but it is obvious that other known bus solutions, such as a parallel bus or even a combined serial/parallel bus, can be used as the interface bus 10.

The user interfaces UI1, UI2 of the processor blocks 2a, 2b are composed of e.g. a display device 5a, 5b and/or a keyboard 6a, 6b, in a way known as such. The user interface can also comprise audio means 7a, 7b, such as a receiver and a microphone. The first UI1 and the second user interface UI2 do not have to be identical, but the invention can also be applied in connection with different user interfaces. The user interfaces can also contain country-specific adjustments, such as language versions, by means of which for instance messages, instructions, or the like, generated by the electronic device 1, can be displayed on the display device 5a, 5b of the user interface in the language selected e.g. by the user of the electronic device 1. The memory means 4a, 4b comprise advantageously a random access memory RAM, a read only memory ROM and a non-volatile memory NVRAM. There are different known types of non-volatile read only memory, of which electrically erasable programmable read only memory EEPROM and FLASH memory can be mentioned in this context. Typically, such non-volatile memory circuits are used to store data that is seldom changed, such as different default values and application programs. Writing into such a non-volatile memory circuit requires much more time than writing into a random access memory, and thus non-volatile memory circuits are not typically used to store rapidly changing data. It is also possible to advantageously implement the memory means 4a, 4b at least partly with internal memory means in the processors 3a, 3b.

The processors 3a, 3b are microprocessors, microcontrollers or corresponding means known as such, and they can also comprise an application-specific integrated circuit ASIC, in which it is possible to implement at least some of the logic functions and possibly also some of the memory means 4a, 4b.

The implementation of the bus interface means 8a, 8b depends on the application in question and on the manner in which the internal inteface bus 10 is implemeted in the electronic device. These bus interface means 8a, 8b and the internal interface bus 10 are used for data transmission between the processor blocks 2a, 2b, which is prior art known by anyone skilled in the art.

The external interface means 9 comprise for example means MCIF (Memory Card Interface) for coupling a memory card 12, such as a multimedia memory card MMMC. In a second preferred embodiment of the invention, these external interface means 9 comprise infrared data transmission means IR, as presented in the electronic device 1 according to FIG. 3 and marked with the reference number 18. According to the invention, the electronic device 1 can also be implemented in such a way that it contains several external interface means 9 of different types, for example said infrared interface means IR and interface means of the multimedia memory card.

The multimedia memory card MMMC is a data recording and communication card type developed by the international Multimedia Card Association. Such a multimedia memory card comprises memory means, control means and means for coupling the card to an electronic device. Data transmission between the multimedia memory card and the electronic device 1 is based on serial mode data transmission.

EXAMPLE 1

In the following, the function of the electronic device 1 according to the invention and the method according to the invention will be described with the example of downloading the operating systems by means of the memory card 12. At the stage of starting up the electronic device 1, the processors 3a, 3b of the processor blocks 2a, 2b start performing initialization procedures in order to set the different parts of the processor blocks 2a, 2b into the desired mode. As is well known, at the start-up stage, the processors start executing the program code from a predetermined address. This address is not, however, the same for all processors, but that has no significance in view of applying this invention. This so-called initial start-up program is preferably stored in the read only memory ROM or in that part of the non-volatile memory which is protected against erasing and overwriting. Thus, it can be better ensured that possible error situations do not delete the initial start-up program and thus prevent a restart. Typically, the initial start-up program also sets the different functions, such as the display and the keyboard, of the user interface into working order. Furthermore, in the initial start-up program, the interface bus means 8a, 8b and the external interface means 9 are set into working order. Some of these initialization procedures can also be arranged in the subordination of the operating system, for example in some operating systems it is possible to select the resolution of the display during the operation of the electronic device 1. However, also in these applications, the initial start-up program sets the display in a basic function mode.

When the initial start-up program is terminated, the processor 3a, 3b typically moves on to execute an operating system program, if such a program is installed in the processor blocks 2a, 2b of the electronic device. By means of the operating system, the user of the electronic device 1 can control and use the different functions of the electronic device 1, for example set up a call, start a calendar application in order to read information stored in the same and to store new information, execute data transmission between the electronic device 1 and another device for example via a mobile communication network, etc.

Figure 2:
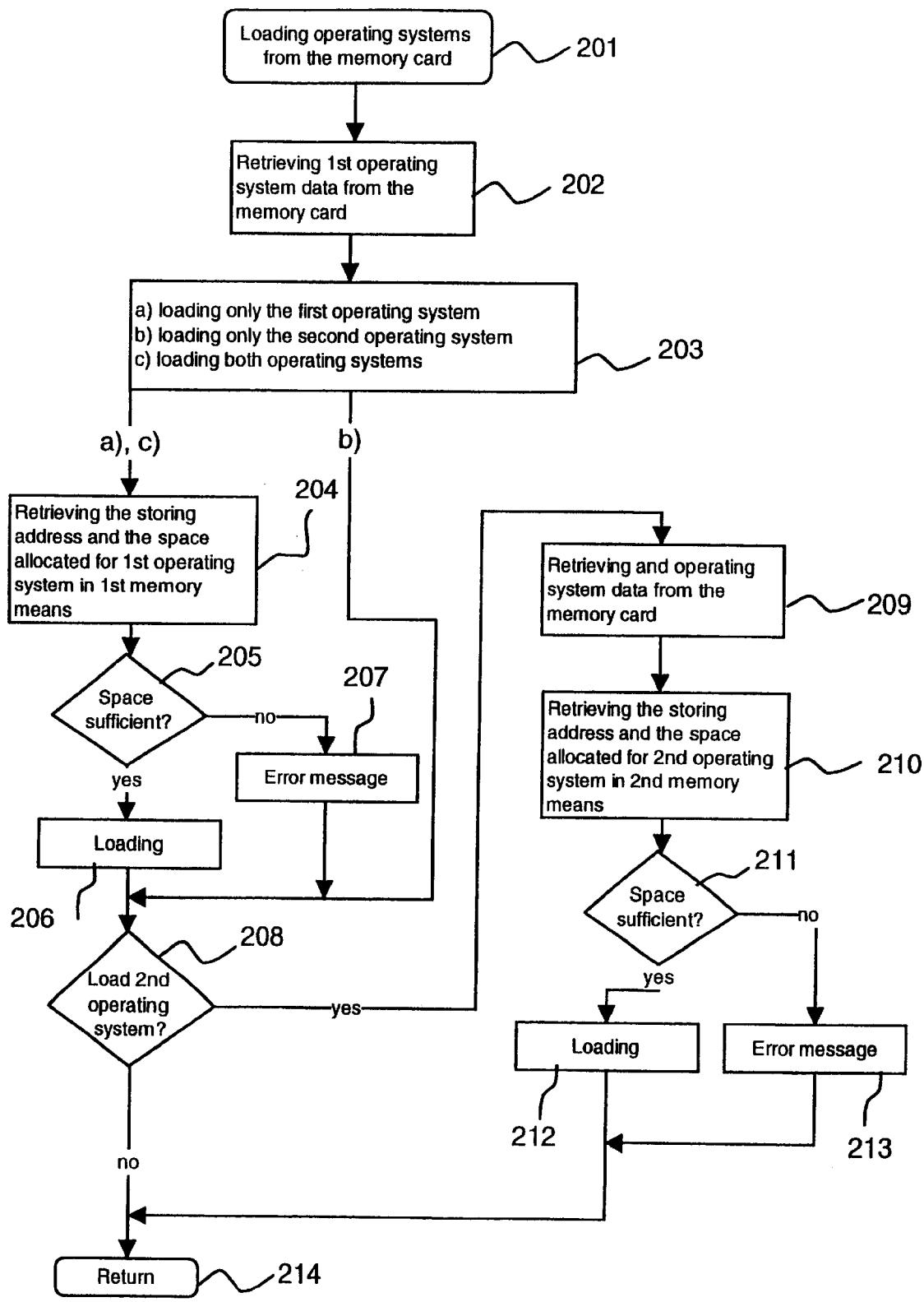
FIG. 2 is a reduced flowchart showing updating of operating systems in an electronic device according to the first preferred embodiment of the invention.

If one wishes to update the operating system in the electronic device 1 according to this first embodiment of the invention, the first step is to start an updating program 201 which is stored in the software of the first processor block 2a for this purpose and whose operation is described in a reduced manner in the flowchart of FIG. 2. The updating is performed by the memory card 12, or the like, advantageously in the following way. The memory card 12 is set in the interface MCIF established for this purpose in the electronic device 1, advantageously containing means for detecting the coupling of the memory card 12, which means advantageously comprise for example an identification line 21. The coupling of the memory card 12 to the interface MCIF generates a change in the voltage of the identification line 21, on the basis of which an interrupt request is generated to the first processor 3a. This causes the first processor to move on to execute an interrupt service program, which in this case is an updating program 201, as is obvious for anyone skilled in the art. The detection of the coupling of the memory card can also be implemented with other methods, but it is not necessary to describe them in detail in this context.

This updating program 201 for example reads the version data of the operating systems stored in the memory card 12 (block 202) and reports them together with instructions on the display 5a of the first processor block (block 203). If the memory card 12 contains e.g. the updating versions of the first operating system and of the second operating system, the instructions suggest a) updating only the first operating system, b) updating only the second operating system and c) updating both operating systems. A further possibility is that the user wishes to cancel the updating function, wherein the function is restored in the subordination of the operating system in a way known as such. After selecting the updating alternative in the updating program of the operating system, the processor of the first processor block 2a starts to transmit data from the memory card 12.

In this preferred embodiment, the downloading of the first operating system is started for example in such a way that the first processor block 2a is used to examine the storing address of the first operating system in the first memory means 4a (blocks 204 and 205). At the same time, it is possible to check whether the memory space allocated for the first operating system in the memory means 4a is sufficient for the new operating system updating. If the space is sufficient, the operating system is downloaded in block 206. This downloading is performed in a way known as such, by reading from the memory card 12, in a storage location indicated by the storing address, a first piece of information, such as a byte or a word and by storing it in a first storing address allocated for the operating system in the first memory means. The next byte is read from the next storing location and stored in the next storing address in the first memory means. The information following next is downloaded correspondingly, until the entire first operating system is downloaded in the first memory means 4a. If it is detected above in block 205 that the space allocated for the first operating system is not sufficient for the new updating version, an error message is preferably produced on the display means of the first user interface UI1 (block 207), after which the operation advantageously moves on to block 208.

In block 208, it is examined whether the user has selected the second operating system to be downloaded. If the user selected in block 203 the alternative a) i.e. to download only the first user interface, downloading is terminated and the program execution returns in the subordination of the first operating system. However, since the new operating system version is now updated, the next step is to conduct the initialization procedures of the operating system. The content of these initialization procedures depends on the electronic device 1 used in the application and on the type of the first processor block 2a.

If the user selected in block 203 either of the alternatives b) and c), instead of the alternative a), downloading procedures largely similar to the downloading procedures of the first operating system are executed for the second operating system. This preferred embodiment of the downloading of the second operating system is illustrated in FIG. 2 with blocks 209–212. The first step in block 209 is to retrieve the storing address of the operating system in the second memory means 4b as well as the size of the memory area allocated for the second operating system in these second memory means 4b. In this preferred embodiment, the retrieval of the second operating system data from the second memory means 4b is conducted in such a way that the processor 3a of the first processor block transmits a reading request via the first bus interface means 8a to the internal interface bus 10, from which the processor 3b of the second processor block reads this information via the second bus interface means 8b. After this, the processor 3b of the second processor block writes the requested information via the second bus interface means 8b into the internal interface bus 10. Thus, the processor 3a of the first processor block reads this information by means of the first bus interface means 8a. Since in this embodiment the internal interface bus 10 is a fast serial bus, the bus interface means 8a, 8b comprise a serial to parallel converter, by means of which data in parallel mode is converted to serial mode and vice versa. These bus interface means 8a, 8b can also comprise an interrupt line, by means of which the bus interface means 8a, 8b can transmit information to the processor 3a, 3b that a new message to be read has arrived from the internal interface bus 10. Thus, the application software of the processor 3a, 3b is provided with an interrupt service program, in which the procedures (program commands) are specified by means of which the processor 3a, 3b reads from the corresponding bus interface means 8a, 8b the information written therein via the interface bus 10, which is known as such by anyone skilled in the art.

After retrieving the necessary information on the second operating system from the second processor block 2b by the downloading sofware generated in the first processor block 2a, it is examined in the downloading software whether the new version of the second operating system fits in the space allocated for the second operating system in the memory means 4b of the second processor block (block 210). If the space is sufficient, the second operating system is downloaded in block 211 for example in the following way: the processor 3a of the first processor block reads this second operating system from the memory card 12, and stores it temporarily in the first memory means 4a. After this reading and storing, the transfer of the second operating system to the second processor block 2b is started for example by following the above presented principles. In other words, the first processor 3a advantageously writes one byte at a time in the first bus interface means 8a, from which the information is transmitted via the internal interface bus 10 to the second bus interface means 8b. After this, the second processor 3b reads the information from the second bus interface means 8b and stores it in the second memory means 4b in the space allocated for the second operating system. This transfer procedure is continued until the entire second operating system is transferred. On the other hand, this downloading of the second operating system can also be performed in smaller units, wherein the first processor 3a reads a part of the second operating system from the memory card 12, stores it temporarily in the first memory means 4a, transmits the part that has been read via the internal interface bus 10 to the second processor block 2b, in which the second processor 3b stores this part in the second memory means 4b. It is obvious that the second operating system can also be downloaded one byte at a time, wherein the intermediate storing in the first memory means 4a is not necessary, but in practical applications, such downloading in bytes or in small blocks is slower than the alternative presented above, in which the entire operating system is read in the first operating means 4a, and first after that it is transmitted to the second processor block 2b, but on the other hand this alternative requires more storing capacity in the first memory means 4a.

If, however, it is detected in block 210 above that the space allocated for the new second operating system version in the second memory means 4b is not sufficient, an error message is advantageously generated for an operating means of the first user interface UI1 (block 212) and the downloading program is exited (block 213). Also, when the downloading procedure is terminated, the operation is transferred to block 213, after which the next step is to return into the subordination of the first operating system.

The above-described procedure of downloading the two operating systems is advantageously provided in the basic software of the first processor block 2a. It can, however, also be implemented in such a way that this basic software is provided with only the program commands necessary for the downloading of the first operating system. Thus, the downloading of the second operating system is implemented in connection with the first operating system, wherein at least the first operating system has to be loaded in the first processor block 2a before the second operating system can be downloaded.

The procedure of downloading the operating systems can also be implemented automatically, for example in such a way that when a memory card 12 containing such operating systems is coupled to the external interface means 9, the processor 3a of the first processor block detects this coupling, after which it examines the type of the memory card 12. If the memory card 12 is a card for updating the operating systems, the above-presented downloading procedures are started automatically, wherein block 203 is not executed, but the operation moves directly to block 204. Correspondingly, in block 208 it is examined whether the coupled memory card 12 contains also a second user interface which is thus advantageously downloaded in the manner presented in blocks 209–212 above.

EXAMPLE 2

Figure 3:
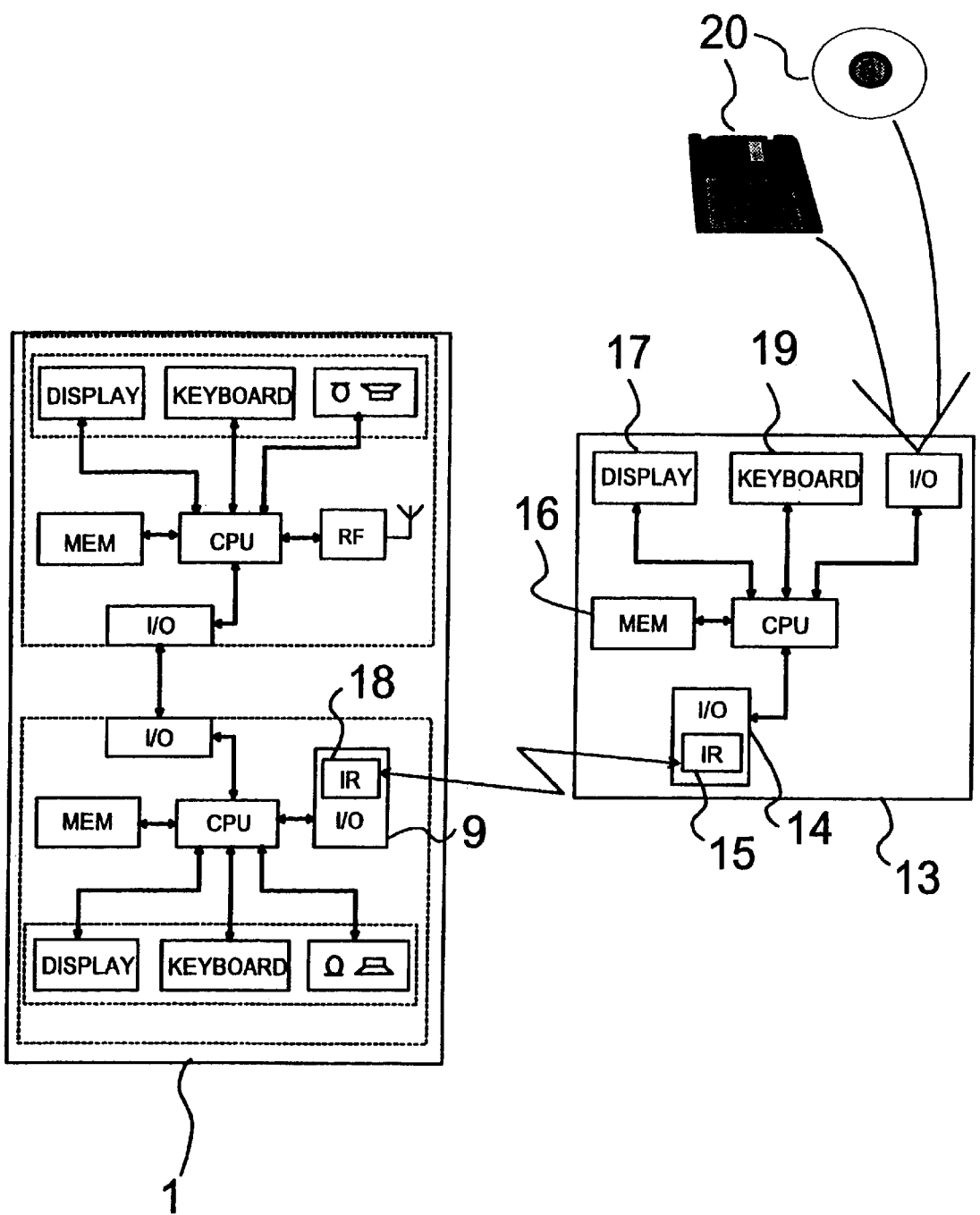
FIG. 3 shows an electronic device according to the first preferred embodiment of the invention in a reduced block diagram.

In the following, the downloading of the operating systems according to the second preferred embodiment of the invention will be described with reference to the block diagram in FIG. 3 and the flowchart in FIG. 4. In this embodiment, the downloading is conducted from a separate data processor 13 via data transmission means 14. The data processor is for example a portable computer (laptop PC). Data transmission can be conducted either via a landline or in a wireless manner, for example by means of infrared interface means, inductively, or via a radio frequency data transmission. In this embodiment, infrared interface means 15 are used, but by following the same principles, it is possible to apply the invention also by using other data transmission methods. The operating systems to be updated are stored for example on a diskette 20, from which they can be read with a data processor 13. In this context, the diskette 20 refers to a storing means, known as such, containing information which can be at least read by a data processor 13. Examples that should be mentioned are a 3.5" diskette, a CD disc, a hard disc, a PCMCIA memory card and a FLASH memory card.

The data processor 13 is used to start a program 401 for downloading the operating systems. The downloading program generates a menu or the like on the display 17 of the data processor, to indicate the versions of the operating systems and possibly also other information included on the diskette on the operating systems to be downloaded (block 402). On the basis of this data, the user can select, for example by means of a keyboard 19 of the computer, whether a) only the first operating system, b) only the second operating system or c) both operating systems are downloaded. If the user selects the alternative a) or c), the function of the updating program 401 moves on to block 403 in the data processor, in which block the data processor 13 starts a connection set-up to the electronic device 1, and indicates that the updating of the first operating system is started. Thus, the electronic device 1 moves on to a downloading program 411 of the operating systems, either automatically after receiving a request message or the like for the connection set-up, or set by the user, and starts to wait for data to be transmitted from the data processor 13 (block 412). In the data transmission, it is possible to use for example communication according to the IrDA standard by means of infrared data transmission means 15, 18.

In the data processor 13, the downloading program reads the first operating system from the diskette and stores it temporarily in the memory means 16 of the data processor (block 404). After this, the first operating system is transmitted via the infrared data transmission means 15 to one or more electronic devices 1 (block 405), in which the data is received (block 413) by external interface means 9, which in this embodiment comprise infrared data transmission means 18, at least an infrared receiver. The data transmission takes place in a serial mode, wherein a serial to parallel conversion is performed in these external interface means 9, wherein the first processor 3a can read the received information in parallel mode. The received information is stored by the first processor 3a in the first memory means 4a (block 414), as presented above in example 1 in connection with the downloading of an operating system according to the first preferred embodiment of the invention, to which reference is made in this context.

Loading of the first operating system is followed by downloading of the second operating system, if the user has selected the second operating system to be downloaded (alternatives b) or c)). This downloading follows primarily the procedures executed in connection with the downloading of the first operating system, which procedures essentially include reading the second operating system from the diskette 20 into the memory means 16 of the data processor (block 407), setting the electronic device into a mode for updating the second operating system (blocks 408 and 415), transmitting the second operating system from the data processor (block 409), receiving it by means of the electronic device 1 (block 416), and storing it in the first memory means 4a (block 417), and transferring the second operating system to second memory means 4b in the second processor block 2b (block 418 in the flowchart of FIG. 4). Furthermore, the conclusion of the updating function can be reported by means of a logout command transmitted to the electronic device 1 (block 419), wherein the electronic device 1 exits the updating program 411 of the operating systems (block 420), after which the operation is advantageously continued with a start-up of the new operating system versions, as mentioned above in example 1.

Figure 4:
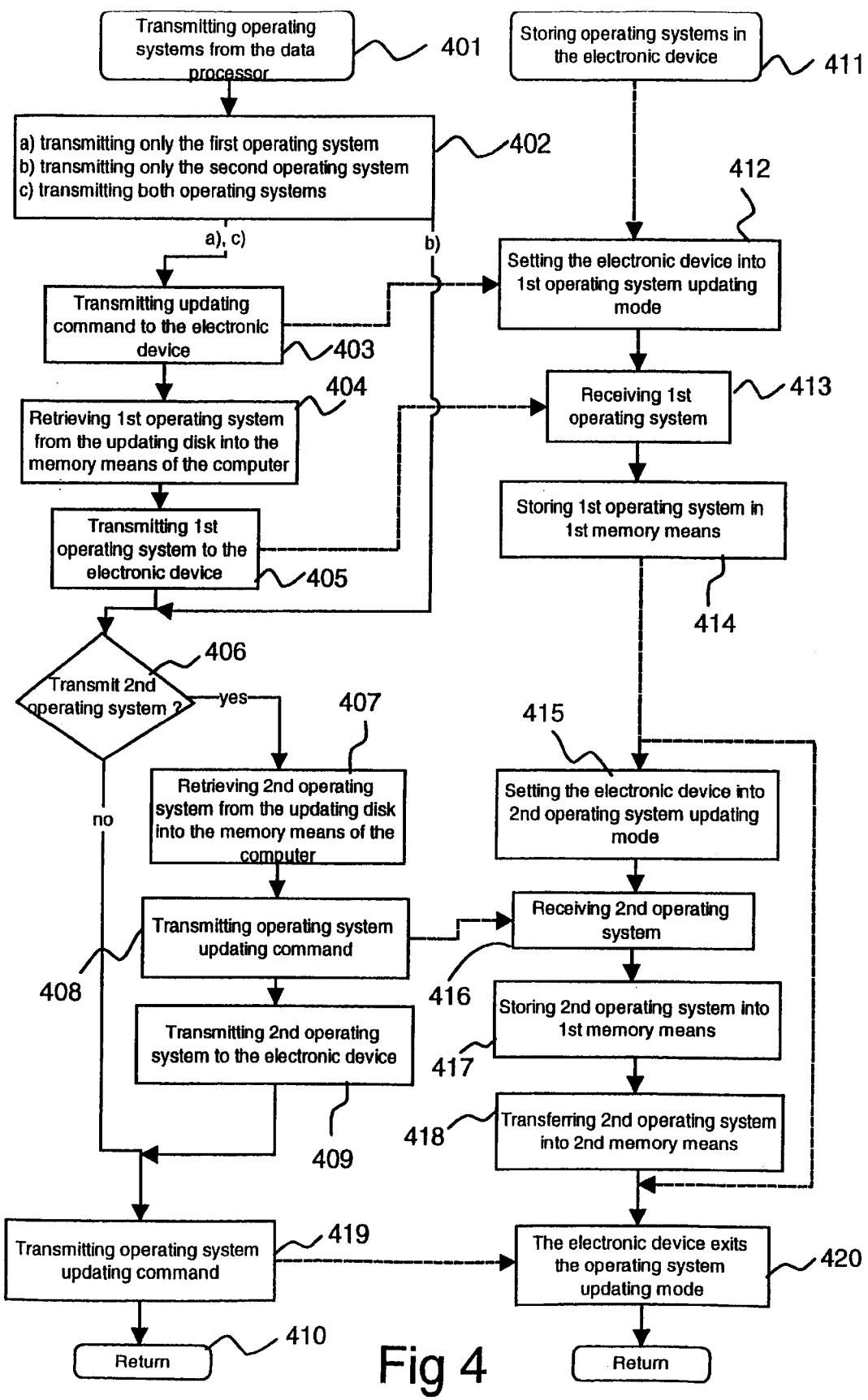
FIG. 4 is a reduced flowchart showing updating of operating systems in an electronic device according to the second preferred embodiment of the invention.

It is assumed within the above-presented downloading procedures of example 2, that the new operating system version fits in the space allocated for it, and therefore, no checkings are presented in the flowchart of FIG. 4 and in the above specification. However, the invention can also be implemented in such a way that the electronic device 1 conducts these checkings which were described in the embodiment of example 1. On the other hand, the checking can also be implemented in such a way that this information is transmitted from the electronic device 1 to the data processor 13, wherein the downloading software of the data processor 13 performs corresponding checkings and reports the possible errors to the user on the display 17 of the data processor.

Figure 5:
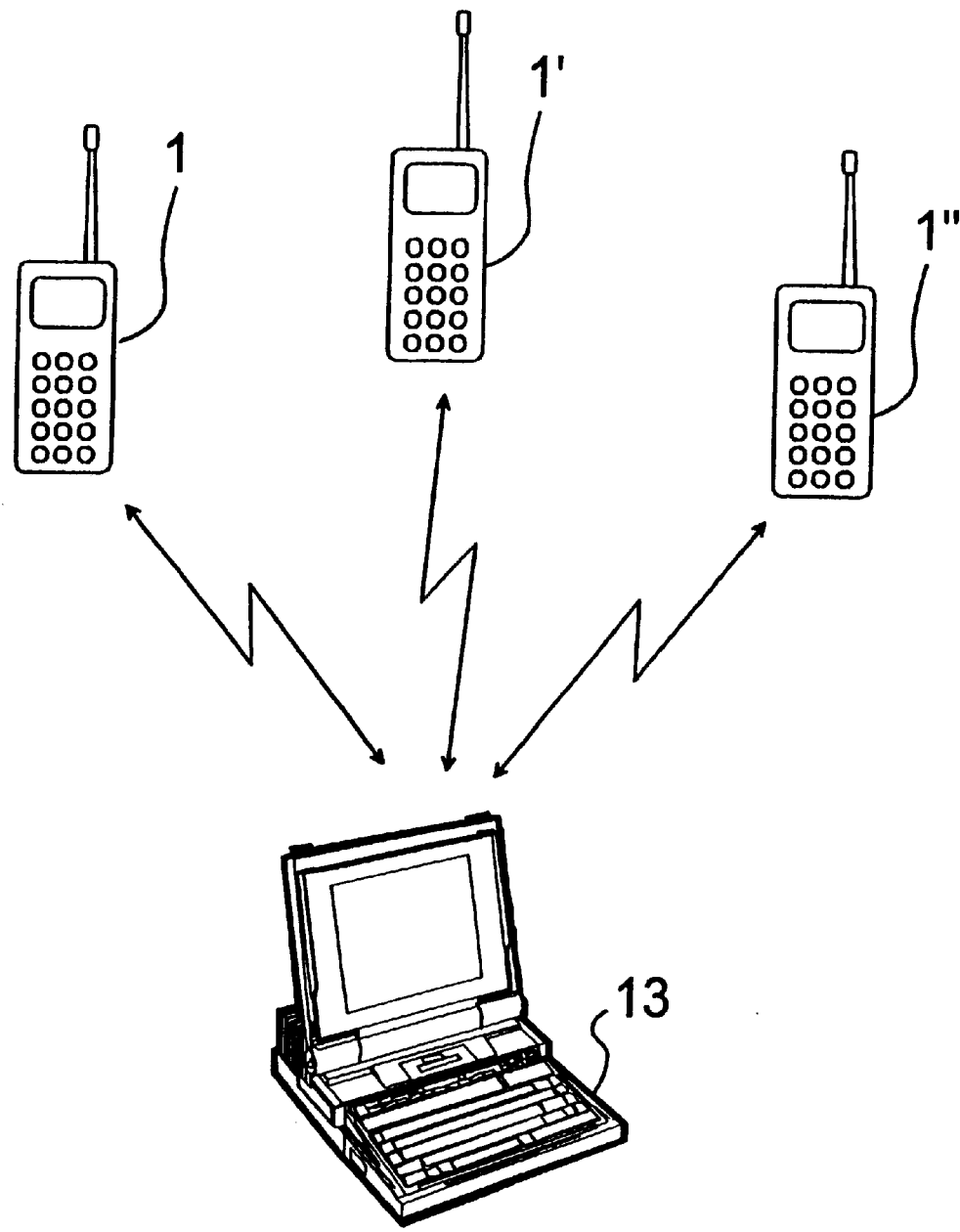
FIG. 5 shows a situation when several electronic devices according to a preferred embodiment of the invention are updated simultaneously.

The advantage of this embodiment according to example 2 is, for instance, that it is possible within one downloading to download the operating systems of several electronic devices 1, 1', 1", as presented in FIG. 5. In this example of FIG. 5, the electronic devices 1, 1', 1" communicate with a data processor 13, and each of them receives information transmitted by the data processor substantially simultaneously. This arrangement enables e.g. the operating systems of several electronic devices 1, 1', 1" to be updated by the importer to the language version of the country in question. Correspondingly, it is possible to provide the electronic devices 1, 1', 1" purchased by a firm with certain basic settings within one downloading, which saves downloading time.

EXAMPLE 3

Furthermore, downloading of operating systems according to a preferred embodiment of the invention via a telecommunication network, such as a mobile communication network, will be described. In this embodiment, the second processor block 2b of the electronic device 1 comprises interface means for coupling to the telecommunication network, advantageously a wireless telecommunication terminal RF (FIG. 3). In this embodiment, external interface means 9 are not necessary for executing the downloading. The downloading can be started by setting up a data transmission connection, e.g. a data call to the database in which the programs to be downloaded are located. One such database can be a database maintained by the manufacturer or importer of the electronic device 1. The data transmission connection is set up in the second processor block 2b. The updating data is transferred by following the principles presented above in connection with the other embodiments, wherein during the connection, new updating data is temporarily stored in the second memory means 4b. After transferring the data, the section (operating system/control software of the user interface) of the second processor block 2b to be updated is transferred to a location allocated for it in the second memory means 4b, and the section of the first processor block 2a to be updated is correspondingly transferred to a location allocated for it in the first memory means 4a.

In this embodiment according to example 3, it is also possible to use procedures in which the software is downloaded for example in a compressed (packed) form via a telecommunication network to the electronic device 1, in which the compressed form is decompressed and the software is stored on the memory card 12, or the software is stored in the compressed form on the memory card 12 and decompressed first at the downloading stage. Downloading can be performed for example by following the principles presented above in connection with example 1.

A further embodiment that can be mentioned is an electronic device 1 which comprises a data processor, such as a personal digital assistant PDA (not shown), implemented with two or more processors 3a, 3b. To such an electronic device, it is possible to couple a telecommunication terminal for example via a separate telephone cable in a way known as such. The above-presented downloading can be executed either via this external telecommunication terminal or via other external interface means.

The downloading program containing the downloading procedures can also be supplied in a separate storing means, such as a memory card 12. Thus, when the electronic device 1 does not contain a downloading program and operating systems installed, the downloading can be conducted by starting a downloading program located in the storing means. This downloading program can be used to load for instance the operating systems into one processor block 2a, 2b wherefrom they can be loaded into the other processor blocks as presented above.

Although the invention was described above in connection with downloading and updating of operating systems, it is obvious that instead of operating systems, it is also possible according to the invention to update other program data in an electronic device 1, which comprises two or more processor blocks 2a, 2b. Furthermore, the invention is not restricted solely to systems of two operating systems and two processor blocks 2a, 2b, but there can also be several of these. In that case, the principles presented above can still be applied by anyone skilled in the art, and thus it is not necessary to describe them in more detail in this context. Also in other respects, the present invention is not restricted to the embodiments presented above, but it can be modified within the scope of the appended claims.

What is claimed is:

1. A method for downloading control software/operating systems of user interfaces into an electronic device (1) which comprises two or more central processing units (2a, 2b), wherein at least two of the two or more central processing units (2a, 2b) each have an individual hardware user interface (UI1, UI2), and in the electronic device (1) one or more operating systems are also executed, characterized in that the downloading is executed via one said central processing unit (2a, 2b), wherein the control software/operating systems of the user interfaces are loaded into said one central processing unit (2a, 2b), from which the control software/operating systems related to other user interfaces are loaded into said other central processing unit (2a, 2b).

2. The method according to claim 1, characterized in that the control software/operating systems of the user interfaces (UI1, UI2) are downloaded from a memory card (12), such as a multimedia memory card (MMMC).

3. The method according to claim 1, characterized in that the operating systems are downloaded from a data processor (13).

4. The method according to claim 3, characterized in that the downloading is conducted at least partly in a wireless manner.

5. The method according to claim 1, characterized in that the first processor block (2a) is used for performing data processing functions and the second processor block (2b) is used for performing mobile station functions.

6. The method according to claim 5, characterized in that the downloading is conducted via a mobile communications network.

7. An electronic device (1) comprising:

at least one processor (3a, 3b), at least two central processing units (2a, 2b), each having a hardware user interface (U11, U12), memory means (4a) for storing the control software of the user interfaces (U11, U12), means (8a, 8b, 10) for data transmission between a first (2a) and a second central processing unit (2b), and means (3a, 3b) for executing the functions of two or more operating systems, characterized in that the electronic device (1) also comprises downloading means (9) for loading the control software/operating systems of user interfaces into one said central processing unit (2a), and means (3a, 3b, 8a, 8b, 10) for loading control software/operating systems related to other user interfaces from one said central processing unit (2a) into said other central processing units (2b), wherein the downloading of the control software/operating systems of the user interfaces is arranged to be conducted via said downloading means (9).

8. The electronic device according to claim 7, characterized in that the downloading is arranged to be conducted from a memory card, such as a multimedia memory card, wherein the means (9) for downloading the control software/operating systems of user interfaces comprise a memory card interface means (MCI).

9. The electronic device according to claim 7, characterized in that the downloading is arranged to be conducted from a data processor (13) which comprises data transmission means (14) for data transmission between the electronic device (1) and the data processor (13).

10. The electronic device according to claim 9, characterized in that the data transmission means (14) of the data processor comprise means for wireless data transmission, such as infrared data transmission means (15).

11. A storing means for a downloading program of the control software/operating systems of user interfaces into an electronic device (1), which electronic device comprises:

at least one processor (3a, 3b), at least two central processing units (2a, 2b), each having a hardware user interface (U11, U12), memory means (4a) for storing the control software of the user interface (U11, U12), means (8a, 8b, 10) for data transmission between a first (2a) and a second central processing unit (2b), and means (3a, 3b) for executing the functions of two or more operating systems, characterized in that the downloading program contains procedures for downloading the control software/operating systems of user interfaces into one said central processing unit (2a), and procedures for loading control software/operating systems related to other user interfaces from said one central processing unit (2a) into said other central processing units (2b), wherein the downloading of the control software/operating systems of user interfaces is arranged to be conducted by means of a downloading program via one said central processing unit (2a).

12. The storing means according to claim 11, characterized in that it comprises a memory card (12) or memory means (4a, 4b).

13. An electronic device comprising:
    a plurality of central processing units each having an individual hardware user interface;
    an interface for downloading an update program to one of the plurality of central processing units; and
    a selection device coupled to the one central processing unit for allowing a user to select which of the plurality of central processing units to update using the update program upon notification that the update program is available.

14. The electronic device of claim 13, wherein the interface for downloading is a memory device interface.

15. The electronic device of claim 13, wherein the interface for downloading is a data processor interface.

16. The electronic device of claim 13, wherein the interface for downloading is a wireless device interface.

17. The electronic device of claim 13, wherein the update program is an operating system update program.

18. The electronic device of claim 13, wherein the update program is a user interface update program central processing units to update using the update program upon notification that the update program is available.

* * * * *